(12) United States Patent
Hirashima et al.

(10) Patent No.: US 8,978,109 B2
(45) Date of Patent: Mar. 10, 2015

(54) ELECTRONIC CONTROL DEVICE FOR A VEHICLE

(75) Inventors: Osamu Hirashima, Toyota (JP); Yuusuke Satoh, Toyota (JP); Katsunori Kawai, Toyota (JP); Masahiro Makino, Komaki (JP); Koutarou Hara, Nagoya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/514,311

(22) PCT Filed: Sep. 12, 2011

(86) PCT No.: PCT/JP2011/070766
§ 371 (c)(1),
(2), (4) Date: Jun. 7, 2012

(87) PCT Pub. No.: WO2013/038478
PCT Pub. Date: Mar. 21, 2013

(65) Prior Publication Data
US 2014/0196114 A1    Jul. 10, 2014

(51) Int. Cl.
*H04L 29/06* (2006.01)
*G06F 21/44* (2013.01)

(52) U.S. Cl.
CPC .......... *H04L 63/0853* (2013.01); *G06F 21/445* (2013.01)
USPC .............. 726/4; 340/426.13; 340/426.16; 340/426.35; 340/426.36

(58) Field of Classification Search
CPC ........ G06F 21/00; G06F 21/123; G06F 21/44
USPC ............................................................ 726/4
See application file for complete search history.

(56) References Cited

U.S. PATENT DOCUMENTS

| | | | |
|---|---|---|---|
| 6,285,948 B1 * | 9/2001 | Takagi et al. | 701/115 |
| 2003/0009271 A1 * | 1/2003 | Akiyama | 701/33 |

(Continued)

FOREIGN PATENT DOCUMENTS

| | | |
|---|---|---|
| JP | 10-222363 | 8/1998 |
| JP | 2003-46536 | 2/2003 |

(Continued)

OTHER PUBLICATIONS

Fan et al., A Design of Bi-verificationVehicle Access Intelligent Control System Based on RFID, Aug. 2009, 9th International Conference on Electronic Measurement & Instruments ICEMI, pp. 1-569-1-573.*

*Primary Examiner* — Morshed Mehedi
*Assistant Examiner* — Kenneth Chang
(74) *Attorney, Agent, or Firm* — Finnegan, Henderson, Farabow, Garrett & Dunner, LLP

(57) ABSTRACT

An electronic control device for a vehicle configured to be able to rewrite a program related to vehicle control by connecting an external device with the vehicle and by accessing an in-vehicle LAN includes a portable authentication terminal separated from the external device; an in-vehicle authentication system connected with the in-vehicle LAN, configured to authenticate the portable authentication terminal and to be able to transmit a authentication result to the in-vehicle LAN; a repeater configured to relay communications between the external device and the in-vehicle LAN; and a communication authorization unit connected to the in-vehicle LAN and configured to authorize the communications between the external device and the in-vehicle LAN through the repeater if receiving the authentication result of a successful authentication of the portable authentication terminal by the in-vehicle authentication system.

14 Claims, 9 Drawing Sheets

(56) References Cited

U.S. PATENT DOCUMENTS

| | | | |
|---|---|---|---|
| 2005/0086493 A1* | 4/2005 | Ishidoshiro | 713/182 |
| 2006/0115085 A1* | 6/2006 | Iwamura | 380/259 |
| 2008/0059806 A1 | 3/2008 | Kishida et al. | |
| 2008/0148374 A1* | 6/2008 | Spaur et al. | 726/6 |
| 2008/0244757 A1 | 10/2008 | Nakagaki | |
| 2009/0031418 A1* | 1/2009 | Matsuda et al. | 726/21 |
| 2009/0187314 A1* | 7/2009 | Kitamura et al. | 701/45 |
| 2009/0309696 A1* | 12/2009 | Tsuruta et al. | 340/5.22 |
| 2010/0109836 A1* | 5/2010 | Sakuma et al. | 340/5.61 |

FOREIGN PATENT DOCUMENTS

| | | |
|---|---|---|
| JP | 2008-59450 | 3/2008 |
| JP | 2008-239021 | 10/2008 |

\* cited by examiner

ELECTRONIC CONTROL DEVICE FOR A VEHICLE

TECHNICAL FIELD

The present invention generally relates to an electronic control device for a vehicle, and more specifically, to an electronic control device for a vehicle capable of rewriting a program related to vehicle control by connecting an external device with a vehicle and by accessing an in-vehicle LAN.

BACKGROUND ART

Conventionally, a vehicle information rewriting system is known. The vehicle information rewriting system prevents memory contents about vehicle information including software in an electronic control unit for a vehicle from being rewritten by unauthorized use of a program rewriting tool by anyone except for a person entitled to use the program rewriting tool (for example, see Patent Document 1). The vehicle information rewriting system disclosed in Patent Document 1 is configured to include a wireless polling unit in the rewriting tool. The wireless polling unit detects a wireless authentication medium that the person entitled to use the program rewriting tool possesses, by which the rewriting tool can authenticate the wireless authentication medium. [Patent Document 1] Japanese Patent Application Laid-Open Publication No. 2008-59450

DISCLOSURE OF THE INVENTION

Problems to be Solved by the Invention

However, in the vehicle information rewriting system disclosed in Patent Document 1, if another external device is connected to the vehicle, a repeater that relays from the other external device to the in-vehicle LAN (i.e., Local Area Network) allows communication to the in-vehicle LAN because access to the authentication system on the vehicle is not prohibited. Therefore, if an unauthorized external device is connected to the vehicle, there are concerns that the unauthorized external device may slip through the authentication and the vehicle information may be rewritten.

Means for Solving Problems

Accordingly, embodiments of the present invention may provide a novel and useful electronic control device for a vehicle solving one or more of the problems discussed above.

More specifically, the embodiments of the present invention may provide an electronic control device for a vehicle that can prohibit access to an in-vehicle LAN by a person who is not authorized to connect an external device with the vehicle, even if the person uses any external device, and has high security.

One aspect according to one embodiment of the present invention may be to provide an electronic control device for a vehicle configured to be able to rewrite a program related to vehicle control by connecting an external device with the vehicle and by accessing an in-vehicle LAN that includes a portable authentication terminal separated from the external device; a in-vehicle authentication system connected with the in-vehicle LAN, configured to authenticate the portable authentication terminal and to be able to transmit an authentication result to the in-vehicle LAN; a repeater configured to relay communication between the external device and the in-vehicle LAN; and a communication authorization unit connected to the in-vehicle LAN and configured to authorize the communication between the external device and the in-vehicle LAN through the repeater if receiving the authentication result of a successful authentication of the portable authentication terminal by the in-vehicle authentication system.

Another aspect according to one embodiment of the present invention may be to provide an electronic control device for a vehicle configured to be able to rewrite a program related to vehicle control by connecting an external device with the vehicle and by accessing an in-vehicle LAN that includes a portable authentication terminal separated from the external device; an in-vehicle authentication system connected with the in-vehicle LAN, configured to authenticate the portable authentication terminal and the external device, and configured to be able to transmit each authentication result of the portable authentication terminal and the external device to the in-vehicle LAN; a repeater configured to relay communication between the external device and the in-vehicle LAN; a repeater powering authorization unit connected to the in-vehicle LAN and configured to authorize powering the repeater by supplying electricity for the repeater if receiving the authentication result of a successful authentication of the portable authentication terminal by the in-vehicle authentication system; and a communication authorization unit incorporated in the repeater and configured to authorize communication between the in-vehicle LAN and the external device through the repeater if receiving the authentication result of a successful authentication of the external device by the in-vehicle authentication system when powered.

Another aspect according to one embodiment of the present invention may be to provide an electronic control device for a vehicle configured to be able to rewrite a program related to vehicle control by connecting an external device with the vehicle and by accessing an in-vehicle LAN includes a portable authentication terminal separated from the external device; an in-vehicle authentication system configured to be able to authenticate the portable authentication terminal and the external device, and configured to authenticate the external device and to transmit an authentication result of the external device to the in-vehicle LAN if succeeding in authenticating the portable authentication terminal; a repeater configured to relay communication between the external device and the in-vehicle LAN; and a repeater communication authorization unit connected to the in-vehicle LAN and configured to authorize the communication between the external device and the in-vehicle LAN through the repeater by powering and activating the repeater if receiving the authentication result of a successful authentication of the external device by the in-vehicle authentication system.

Other objects, features, and advantages of the present invention will become more apparent from the following detailed description when read in conjunction with the accompanying drawings.

Effect of the Invention

According to embodiments of the present invention, it is possible to inhibit unauthorized access to an electronic control device for a vehicle and to ensure high security.

EXPLANATION OF REFERENCE SIGNS

10 Smart key
20 Vehicle
30 In-vehicle LAN
40, 42, 44 In-vehicle authentication system
41, 43, 45 Verification ECU
50, 51, 52 ECU
60, 63 Repeater
70, 73 Power supply ECU
71 Switch
80 Connector
90 External device

BEST MODE FOR CARRYING OUT THE INVENTION

A description is given below, with reference to drawings of embodiments of the present invention.

First Embodiment

Figure 1:
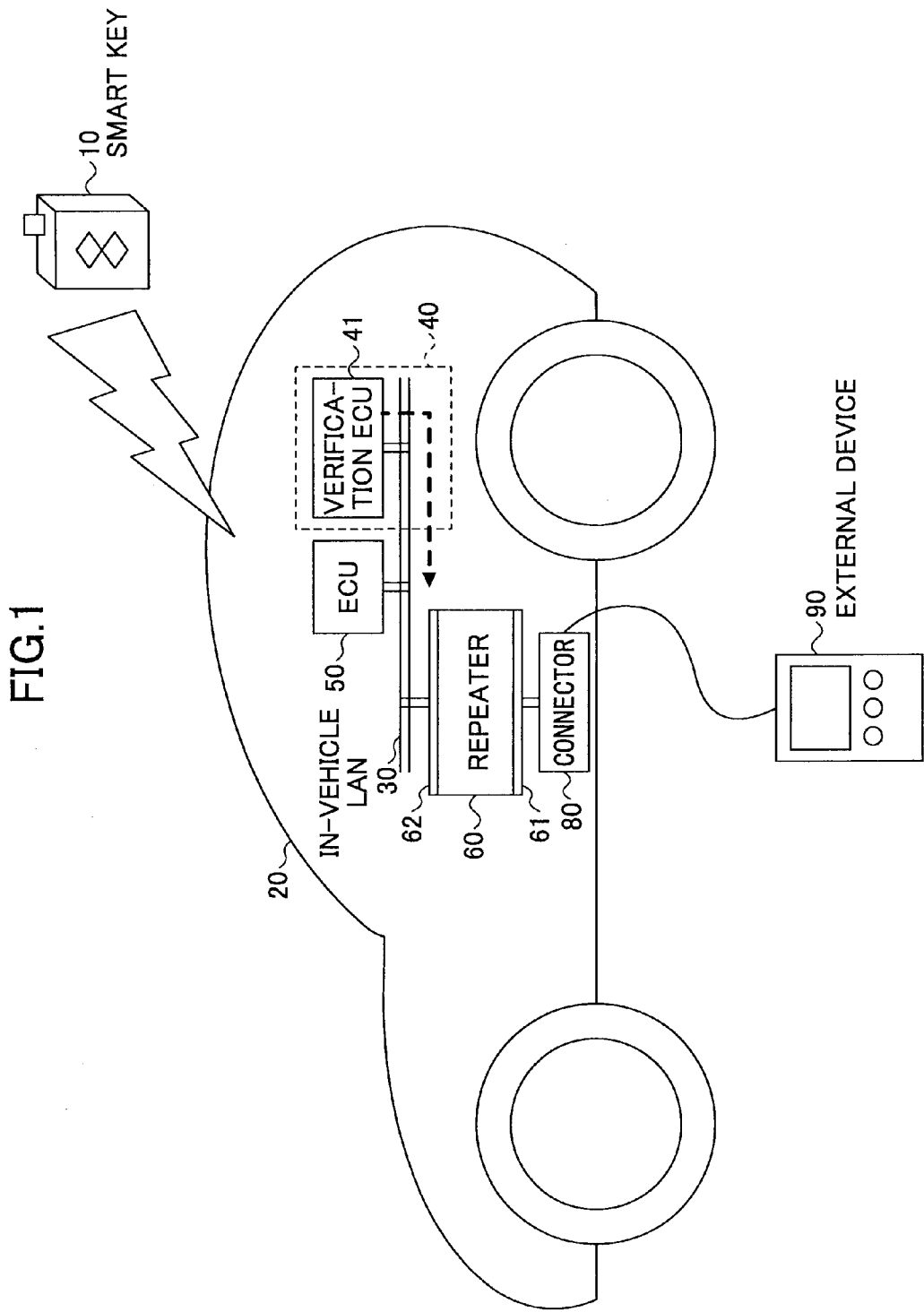
FIG. 1 is a system configuration diagram showing an example of an electronic control device for a vehicle of a first embodiment of the present invention.

FIG. 1 is a system configuration diagram showing an example of an electronic control device for a vehicle of a first embodiment of the present invention. In FIG. 1, the electronic control device for a vehicle of the first embodiment includes a smart key 10, an in-vehicle LAN (Local Area Network) 30, an in-vehicle authentication system 40, a variety of ECUs (Electronic Control Unit) 50, a repeater 60 and a connector 80. Among them, the in-vehicle authentication system 40 includes a verification ECU 41, and the repeater 60 includes an unauthorized access protecting unit 61 and a communication authorization unit 62. Moreover, in FIG. 1, a vehicle 20 and an external device 90 are shown as related components. The smart key 10 can be moved inside and outside the vehicle. The in-vehicle LAN 30, the in-vehicle authentication system 40, the variety of ECUs 50, the repeater 60 and the connector 80 are provided in the vehicle 20. Furthermore, the external device 90 is provided outside the vehicle 20 and connectable with the vehicle 20 through the connector 80.

The smart key 10 is a portable authentication terminal, and has a function of transmitting an ID signal for authentication. The smart key 10 transmits a verification request signal to the verification ECU 41 of the in-vehicle authentication system 40, and requests the verification ECU 41 to verify an ID code. By verifying the ID code, if the smart key 10 is authorized to be used by a qualified user, the user possessing the smart key 10 is authorized to lock and unlock a door of the vehicle 20, to start an engine and the like, and can lock and unlock the door, start the engine and the like without locking and unlocking mechanically by inserting the smart key 10 into a keyhole and without any operations.

In addition, the electronic control device for a vehicle of the present embodiment controls whether or not to authorize communications between the external device 90 and the in-vehicle LAN 30 depending on whether the user possesses the smart key 10 when the external device 90 is connected to the vehicle 20. More specific contents about this point are described hereinafter.

The electronic control device for a vehicle of the present embodiment is mounted on the vehicle 20, and the in-vehicle LAN 30, the in-vehicle authentication system 40, the repeater 60 and the connector 80 are mounted on the vehicle 20 as components. Also, the variety of ECUs 50 is mounted on the vehicle 20 as related components.

The in-vehicle LAN 30 is an in-vehicle network mounted on a vehicle. More specifically, the in-vehicle LAN 30 connects electronic control units that perform various vehicle controls to each other via a bus and forms a network. With this, each of the electronic control units that have respective functions can share a variety of information such as a signal detected by respective sensors and the like. In the in-vehicle LAN 30, the verification ECU 41, the variety of ECUs 50 and the repeater 60 are respectively connected to the bus and are configured to be able to share information.

The in-vehicle authentication system 40 is a unit to authenticate the smart key 10 and the vehicle 20. The in-vehicle authentication system 40 includes the verification ECU 41. If the verification ECU 41 receives a verification request signal of the smart key 10, the verification ECU 41 verifies an ID code and authenticates whether an owner of the smart key 10 is a qualified user of the vehicle 20. If the verification request signal matches the ID code, the in-vehicle authentication system 40 transmits an authentication result of a successful authentication to the in-vehicle LAN 30. If the verification request signal does not match the ID code, the in-vehicle authentication system 40 transmits an authentication result of an authentication failure to the in-vehicle LAN 30. Here, the in-vehicle authentication system 40 may be configured to transmit the authentication result of the successful authentication to the in-vehicle LAN 30 only if the authentication succeeds, and not to transmit the authentication result if the authentication fails.

Moreover, the in-vehicle authentication system 40 may include various functions and units necessary for the authentication of the smart key 10 besides the verification ECU 41.

The variety of ECUs 50 includes an ECU that has a function to perform various controls of the electronic control device for a vehicle. The variety of ECUs 50 includes the ECU that has a function necessary for vehicle control, and the variety of ECUs 50 may be provided according to intended use. Here, the variety of ECUs 50 is connected to the in-vehicle LAN 30, and is configured to be able to share various kinds of information with other ECUs 50 during vehicle control.

The repeater 60 is a communication relay unit to perform communications between the external device 90 and the in-vehicle LAN 30. The repeater 60 is a device that makes the communication possible by allowing a medium and a protocol to exchange different data with each other on a network.

The repeater 60, for example, recognizes all the hierarchy of the OSI (Open Systems Interconnection) reference model, absorbs a difference of a communication medium or a transmission system, and makes a connection between different models possible. In the present embodiment, the repeater 60 is a unit that is provided on the in-vehicle LAN 30, makes the communications between the external device 90 and the in-vehicle LAN 30 possible, and allows the external device 90 to access the in-vehicle LAN 30.

The repeater 60 may be configured in various ways as long as the repeater 60 can relay the communications between the external device 90 and the in-vehicle LAN 30. For example, the repeater 60 may be configured as a gateway ECU.

The repeater 60 is configured to have an unauthorized access protecting function. The unauthorized access protecting function is a function to prevent an unauthorized access from the outside, for example, which includes a filtering function. Here, the unauthorized access protecting function may be implemented by the unauthorized access protecting unit 61 incorporated in the repeater 60.

The repeater 60 includes the communication authorization unit 62 other than the unauthorized access protecting unit 61. The communication authorization unit 62 is a unit that authorizes the communications between the external device 90 and the in-vehicle LAN 30 through the repeater 60. More specifically, the unauthorized access protecting unit 62 authorizes the communications of the repeater 60 if receiving the authentication result of the successful authentication between the smart key 10 and the in-vehicle authentication system 40 from the in-vehicle LAN 30, and does not authorize the communications of the repeater 60 if receiving the authentication result of the authentication failure. In addition, the repeater 60 maintains a state of not authorizing the communications of the repeater 60 if not receiving any authentication result.

Here, in FIG. 1, an example is explained in which the unauthorized access protecting unit 61 and the communication authorizing unit 62 are incorporated in the repeater 60 and configured to be an internal function of the repeater 60. However, the unauthorized access protecting unit 61 and the communication authorizing unit 62 may be configured to be independent outside the repeater 60.

The connector 80 is a connecting unit that allows the external device 90 to be electrically connected with the vehicle side. Various connecting units may be used for the connector 80 as long as the connector 80 can connect the external device 90 to the vehicle 20 side. For example, a DLC3 connector for failure diagnosis may be available.

The external device 90 is a device that has a program rewriting function of being able to rewrite programs related to the vehicle control of the electronic control device for a vehicle by being connected with the vehicle 20. In the present embodiment, the external device 90 is illustrated as a device that has functions of being able to perform a failure diagnosis and the like, and of program rewriting.

Next, descriptions are given about a process flow of the electronic control device for a vehicle of the first embodiment having the above mentioned configuration.

Figure 2:
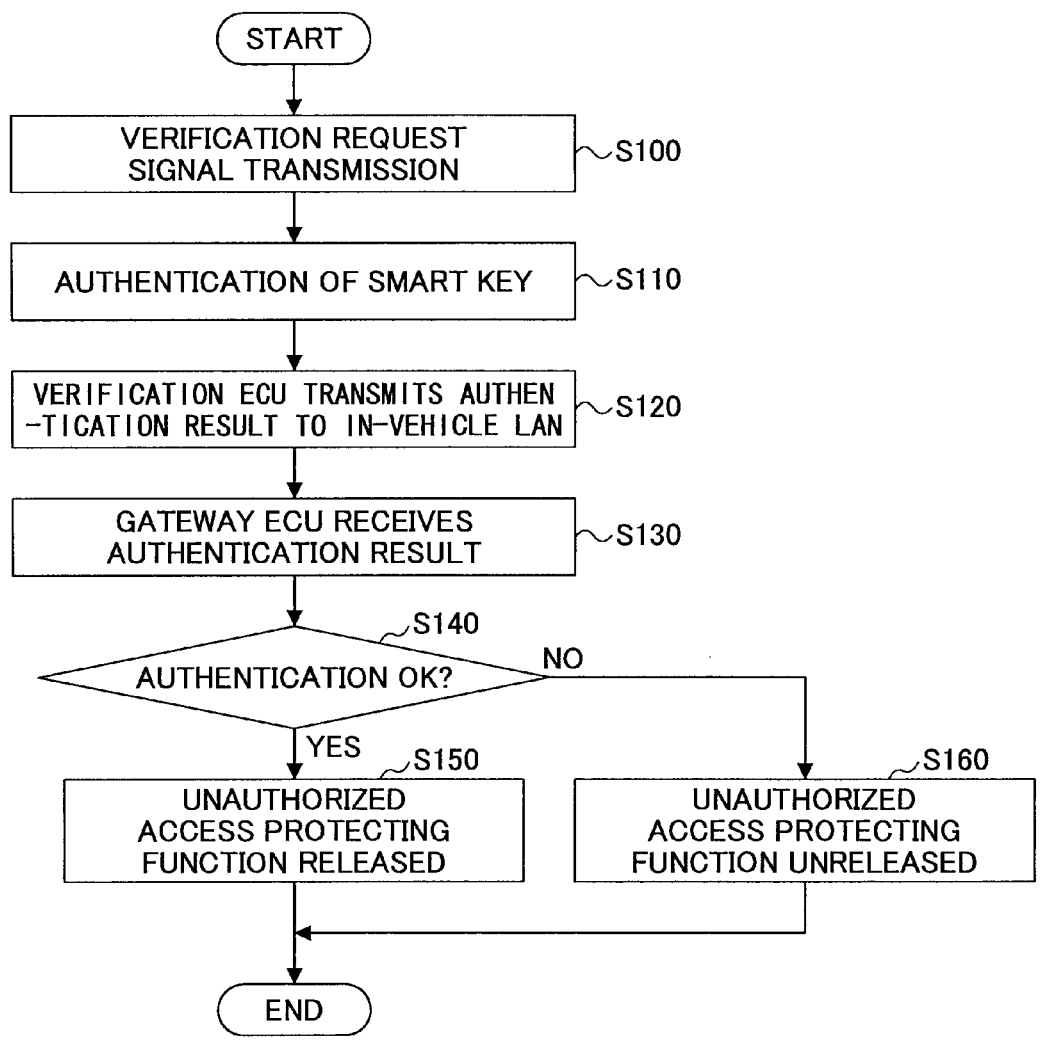
FIG. 2 is a diagram showing an example of a process flow of the electronic control device for a vehicle of the first embodiment.

FIG. 2 is a diagram showing an example of the process flow of the electronic control device for a vehicle of the first embodiment. Here, in FIG. 2, the same numerals are put to components similar to those described in FIG. 1, and the descriptions are omitted.

In step S100, the smart key 10 transmits a verification request signal to the verification ECU 41 of the in-vehicle authentication system 40.

In step S110, the verification ECU 41 that has received the verification request signal 41 from the smart key 10 verifies an ID code and performs authentication between the smart key 10 and the vehicle 20.

In step S120, the verification ECU 41 transmits an authentication result to the in-vehicle LAN 30. If the authentication succeeds, the verification ECU 41 transmits the authentication result (authentication information) of a successful authentication. If the authentication fails, the verification ECU 41 transmits the authentication result (authentication information) of an authentication failure. Here, the verification ECU 41 may transmit the authentication result of the successful authentication only if the authentication is successful.

In step S130, the repeater 60 receives the authentication result (authentication information) through the in-vehicle LAN 30.

In step S140, it is determined whether the received authentication result is the information of an OK authentication (i.e., successful authentication) or the information of a NO authentication (i.e., authentication failure). Here, confirmation of content of the authentication information may be performed by the main body of the repeater 60 or by the communication authorization unit 61 incorporated inside the repeater 60.

In step S140, if it is determined that the authentication is OK, the process proceeds to step S150, and if it is determined that the authentication is not OK, the process proceeds to step S160.

In step S150, the communication authorization unit 61 authorizes the communication, and the unauthorized access protecting unit 62 releases an unauthorized access protecting function. With this, the unauthorized access protecting unit 62 does not work, and filtering and the like are not performed, which allows the in-vehicle LAN 30 to be accessed by the communication through the repeater 60. After that, by connecting the external device 90 to the connector 80, a variety of diagnoses is ready to be performed. In addition, since it is possible to rewrite programs of the variety of ECUs 50 connected with the in-vehicle LAN 30, rewriting the programs may be executed if desired.

On the other hand, in step S160, the communication authorization unit 61 does not authorize the communication, and the communication is prohibited. More specifically, the unauthorized access protecting function by the unauthorized access protecting unit 62 is not released, and the in-vehicle LAN 30 cannot be accessed even if the external device 90 is connected to the connector 80.

In this manner, because the electronic control device for a vehicle of the first embodiment authorizes the access to the in-vehicle LAN 30 by the external device 90 by performing the authentication of the smart key 10 with the vehicle 20, the access is not authorized as long as the electronic control device for a vehicle does not authenticate the smart key 10 that a user possesses as an authorized user of the vehicle 20 even if any external device 90 is used. Hence, security of the electronic control device for a vehicle can be enhanced. Moreover, in the authentication when the external device 90 is connected, since the smart key 10 and the in-vehicle authentication system 40 are utilized, without installing a new authentication system in the external device 90 or the repeater 60, the security can be improved at a low cost without providing a new authentication system.

Figure 3:
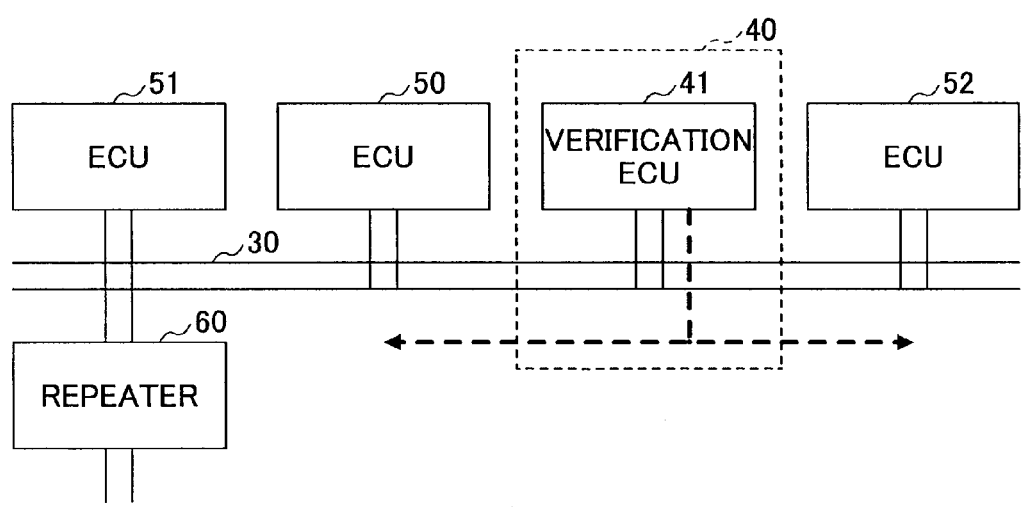
FIG. 3 is an explanatory diagram of an additional effect of the electronic control device for a vehicle of the first embodiment.

FIG. 3 is a diagram to illustrate an additional effect of the electronic control device for a vehicle of the first embodiment. In FIG. 3, the verification ECU 41 of the in-vehicle authentication system 40, various ECUs 50-52, and the repeater 60 are provided, respectively connected to the in-vehicle LAN 30. For example, even if an ECU needed to authenticate the external device 90 is included among the various ECUs 50-52, as well as the repeater 60, by receiving the signal from the verification ECU 41 through the in-vehicle LAN 30, the electronic control device for a vehicle can have the authentication function without causing the respective ECUs 50-52 to incorporate an extra authentication function.

In this way, in the electronic control device for a vehicle of the first embodiment, even if the ECUs 50-52 that need the authentication when connecting with the external device 90 are included other than the repeater 60, the security can be enhanced at a low cost by adopting a system configuration similar to the repeater 60.

Second Embodiment

Figure 4:
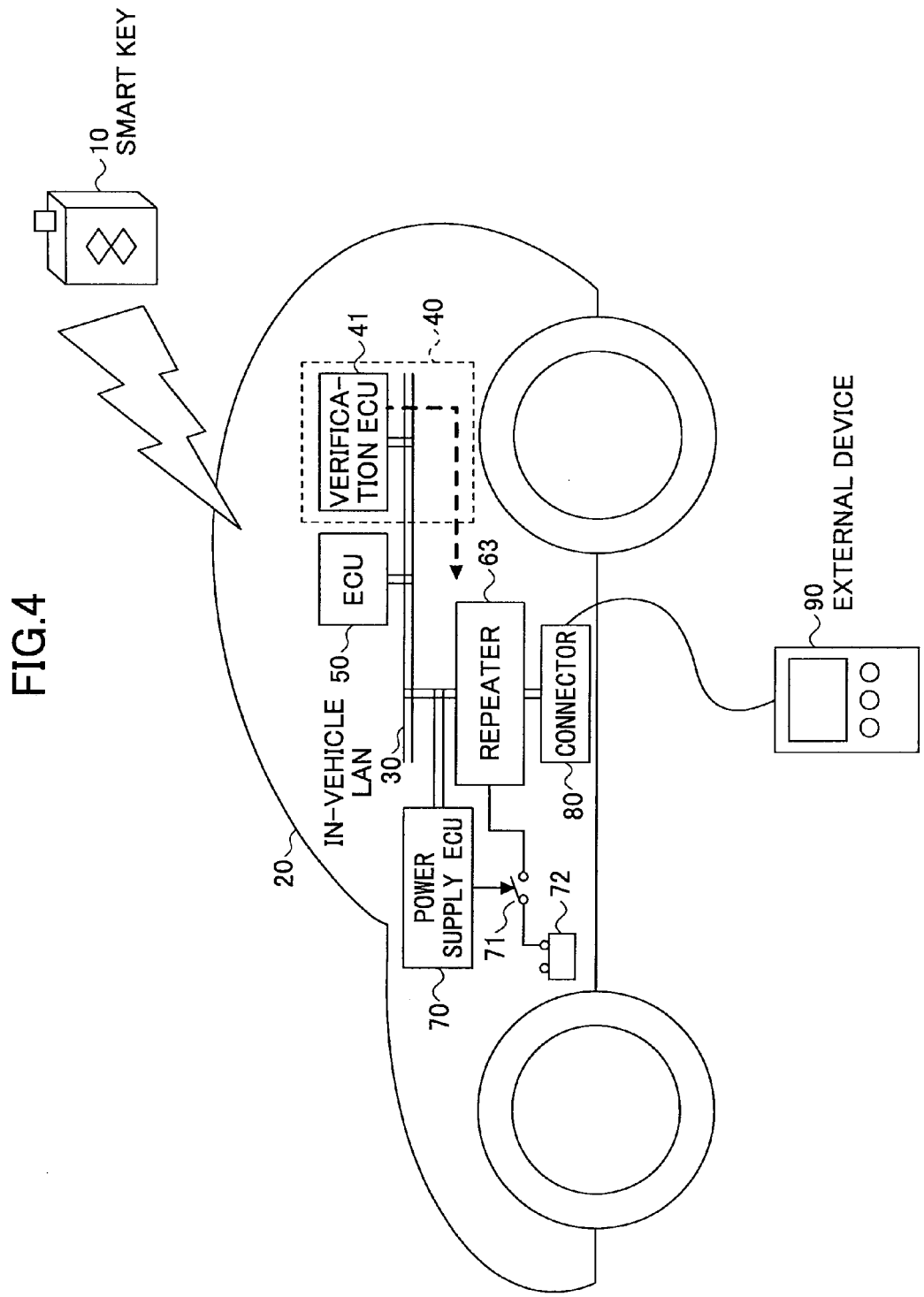
FIG. 4 is a system configuration diagram showing an example of an electronic control device for a vehicle of a second embodiment of the present invention.

FIG. 4 is a system configuration diagram showing an example of an electronic control device for a vehicle of a second embodiment of the present invention. In FIG. 4, the electronic control device for a vehicle of the second embodiment includes a smart key 10, an in-vehicle LAN 30, an in-vehicle authentication system 40, a variety of ECUs 50, a repeater 63, a power supply ECU 70, a power source 71 and a connector 80. Moreover, the in-vehicle authentication system 40 includes a verification ECU 41. Furthermore, as related components, a vehicle 20 and an external device 90 are shown in FIG. 4.

In the electronic control device for a vehicle of the second embodiment, since the smart key 10, the vehicle 20, the in-vehicle LAN 30, the in-vehicle authentication system 40, the variety of ECUs 50, the connector 80 and the external device 90 are similar to the electronic control device for a vehicle of the first embodiment, the same numerals are put to them and the descriptions are omitted.

The electronic control device for a vehicle of the second embodiment differs from the electronic control device for a vehicle of the first embodiment in that the repeater 63 does not include the unauthorized access protecting unit 61 or the communication authorization unit 62, and the power supply ECU 70, the switch 71 and the power source 72 are newly provided. The power source 72 is connected to the repeater 63 through the switch 71, and the power supply ECU 70 is configured to be able to control on and off of the switch 71.

The power supply ECU 70 is a unit that controls connection or non-connection of the power source 72 to the repeater 63, that is, a unit that controls existence or non-existence of power supply, and functions as a communication authorization unit that authorizes the communications between the external device 90 and the in-vehicle LAN 30 by the repeater 63. Corresponding to this, the repeater 63 is configured not to particularly include the communication authorization unit inside.

The electronic control device for a vehicle of the second embodiment gives the communication authorization between the external device 90 and the in-vehicle LAN 30 through the repeater 63, depending on whether to activate or not to activate the repeater 63. In other words, if the electronic control device for a vehicle authorizes the communication of the repeater 63, the electronic control device for a vehicle powers and activates the repeater 63. If the electronic control device for a vehicle does not authorize the communication of the repeater 63, the electronic control device for a vehicle does not supply but cuts off the power to the repeater 63, and does not activate the repeater 63. The repeater 63 relays the communications between the external device 90 and the in-vehicle LAN 30 if the external device 90 is connected to the connector 80 while working. In addition, since such a communication relaying function does not work if the repeater 63 does not operate, the external device 90 cannot access the in-vehicle LAN 30 even if the external device 90 is connected to the connector 80.

Thus, the communication authorization by the repeater 63 may be controlled by existence or non-existence of the power supply. Concretely, such existence or non-existence of the power supply is controlled by the power supply ECU 70.

In other words, when the verification ECU 41 transmits the authentication result of the successful authentication to the in-vehicle LAN 30, the power supply ECU 70 receives the authentication result. Then, if the authentication result is the successful authentication, the power supply ECU 70 turns the switch 71 on, and connects the power source 72 to the repeater 63. By doing this, the repeater 63 is powered, operates and relays the communications between the external device 90 and the in-vehicle LAN 30.

On the other hand, if the authentication result that the power supply ECU 70 has received is the authentication failure, the power supply ECU 70 turns the switch 71 off, and does not connect the power source 72 with the repeater 63. With this, since the repeater 63 is not powered and the repeater 63 does not operate, the communications relaying between the external device 90 and the in-vehicle LAN 30 by the repeater 63 is not performed, and the external device 90 cannot access the in-vehicle LAN 30.

In this manner, in the electronic control device for a vehicle of the second embodiment, the power supply ECU 70 functions as a communication authorization unit, and the power supply ECU 70 controls the authorization or prohibition of the communication depending on the authentication result between the smart key 10 and the vehicle 20. Next, descriptions are given about an operation of the electronic control device for a vehicle of the second embodiment.

Figure 5:
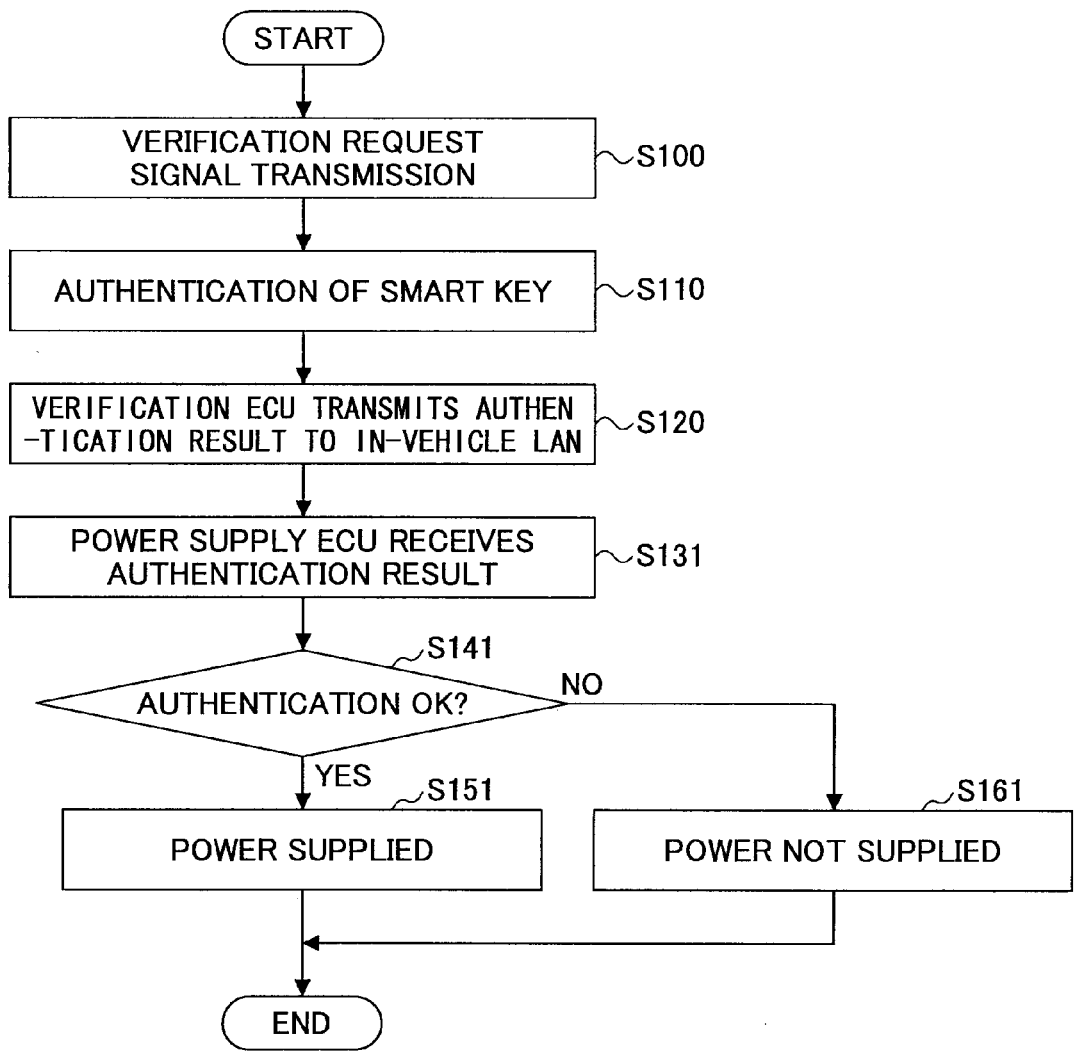
FIG. 5 is a diagram showing a process flow of the electronic control device for a vehicle of the second embodiment.

FIG. 5 is a diagram showing an example of a process flow of the electronic control device for a vehicle of the second embodiment. In FIG. 5, the same numerals are put to the components similar to those described in FIG. 4, and the descriptions are omitted. Also, the same step numbers are put to steps similar to those of the process flow described in FIG. 2 of the first embodiment, and the descriptions are omitted and simplified.

In step S100 in FIG. 5, the smart key 10 transmits a verification request signal. In step S110, the verification ECU 41 of the in-vehicle authentication system 40 authenticates the smart key 10. In step S120, the verification ECU 41 transmits an authentication result to the in-vehicle LAN 30. Here, since steps S100 to S120 are similar to FIG. 2 of the first embodiment, the same step numbers are put to them and the descriptions are omitted.

In step S131, the power supply ECU 70 receives the authentication result from the bus of the in-vehicle LAN 30.

In step S141, the power supply ECU 70 determines whether the authentication result is OK. If the authentication result is an OK authentication (successful authentication), the process proceeds to step S151. If the authentication result is a NO authentication (authentication failure), the process proceeds to step S161.

In step S151, the power supply ECU 70 authorizes communication of the repeater 63, turns the switch 72 on, connects the power source 72 to the repeater 63, and supplies the power for the repeater 63. By doing this, the repeater 63 operates and relays the communications between the external device 90 and the in-vehicle LAN 30. Accordingly, if a user connects the external device 90 to the connector 80, a variety of diagnoses is ready to be performed. Also, the program of each ECU is rewritable as in the first embodiment.

On the other hand, in step S161, the power supply ECU 70 does not authorize the communication of the repeater 63, and cuts off the power source 72 from the repeater 63 by turning the switch 71 off. With this, since the repeater 63 continues to be inactive, the communication between the external device 90 and the connector 80 is not relayed, and the in-vehicle LAN 30 cannot be accessed even if the external device 90 is connected with the connector 80.

In this way, according to the electronic device for a vehicle of the second embodiment, a control operation of communication authorization or prohibition of the repeater 63 is carried out depending on powering or not powering the repeater 63, which makes it possible to improve security of the electronic control device for a vehicle with a simple configuration.

Here, in FIGS. 4 and 5, operation or non-operation of the repeater 63 is controlled by connection or non-connection between the power supply 72 and the repeater 63. However, if a power switch is provided in the repeater 63, the operation or non-operation of the repeater 63 may be switched by turning on and off the power switch of the repeater 63. Moreover, as long as the operation or non-operation of the repeater 63 can be switched, switching control of the operation or non-operation can be performed by other various methods.

Third Embodiment

Figure 6:
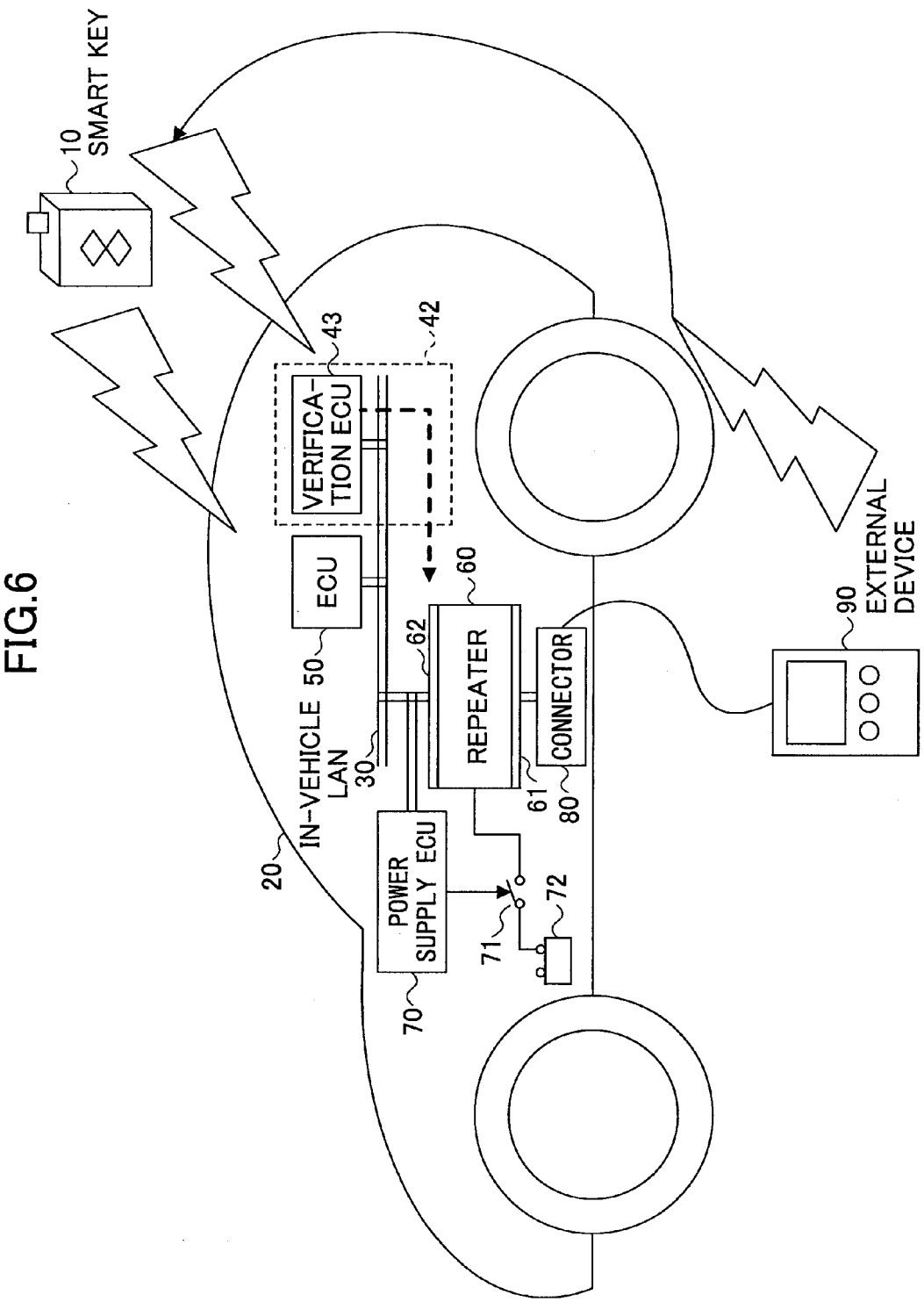
FIG. 6 is a system configuration diagram showing an example of an electronic control device for a vehicle of a third embodiment of the present invention.

FIG. 6 is a system configuration diagram showing an example of an electronic control device for a vehicle of a third embodiment. The electronic control device for a vehicle of the third embodiment includes a smart key 10, an in-vehicle authentication system 42, a variety of ECUs 50, a repeater 60, a power supply ECU 70, a switch 71, and a power source 72. Furthermore, the in-vehicle authentication system 42 includes a verification ECU 43, and the repeater 60 includes an unauthorized protecting unit 61 and a communication authorization unit 62. In addition, a vehicle 20 and an external device 90 are shown in FIG. 6.

In the electronic control device for a vehicle of the third embodiment, since the smart key 10, the vehicle 20, the in-vehicle LAN 30, the variety of ECUs 50, the repeater 60, the unauthorized access protecting unit 61, the communication authorization unit 62, the power supply ECU 70, the switch 71, the power source 72, the connector 80 and the external device 90 are similar to the electronic control device for a vehicle of the first and second embodiments with regard to the respective components, the same numerals are put to them and the descriptions are omitted.

The electronic control device for a vehicle of the third embodiment differs from the first and second embodiments in that not only the authentication between the vehicle 20 and the smart key 10 but also the authentication between the vehicle 20 and the external device 90 are performed, and the electronic control device for a vehicle includes the power supply ECU 70 used as a communication authorization unit in the second embodiment, with the communication authorization unit 62 included in the repeater 60. Moreover, the electronic control device for a vehicle of the third embodiment differs from the first and second embodiments in that the verification ECU 43 becomes the in-vehicle authentication system 42 that has functions of performing the authentication between the external device 90 and the vehicle 20 not as well as the authentication between the smart key 10 and the vehicle 20.

The verification ECU 43 of the in-vehicle authentication system 42 is configured to be able to authenticate the smart key 10 and the external device 90. The verification ECU 43 authenticates the smart key 10 by receiving the verification request signal from the smart key 10, and by verifying an ID code, similarly to the first and second embodiments. On the other hand, the authentication of the external device 90 may be performed under conditions of a successful authentication of the smart key 10, or may be performed independently despite the success or failure of the authentication of the smart key 10.

If the authentication of the external device 90 is performed under conditions of the successful authentication of the smart key 10, the ID code of the external device 90 is verified after the verification of the ID code of the smart key 10 is finished and the authentication is successful. The verification ECU 43 may transmit the authentication result at each authentication, so that the verification ECU 43 transmits the authentication result of the smart key 10 to the in-vehicle LAN 30 after finishing the authentication of the smart key 10, and the verification ECU 43 transmits the authentication result of the external device 90 to the in-vehicle LAN 30 after finishing the authentication of the external device 90.

On the other hand, if the authentications of the smart key 10 and the external device 90 are independent of each other, the verification ECU 43 transmits the authentication result at each authentication, so that the verification ECU 43 transmits the authentication result of the smart key 10 to the in-vehicle LAN 30 after finishing the authentication of the smart key 10, and transmits the authentication result of the external device 90 to the in-vehicle LAN 30 after finishing the authentication of the external device 90.

Here, for easy understanding, an example is illustrated in which the verification ECU 43 transmits the authentication result of the smart key 10 to the in-vehicle LAN 30, and then transmits the authentication result of the external device 90 to the in-vehicle LAN 30.

To begin with, when the verification ECU 43 transmits the authentication result to the smart key 10, the power supply ECU 70 receives the authentication result. Then, if the power supply ECU 70 receives the authentication result of the successful authentication, the power supply ECU 70 turns the switch 71 on, connects the power source 72 to the repeater 60, and authorizes powering the repeater 60. In contrast, if the power supply ECU 70 receives the authentication result of the authentication failure, the power supply ECU 70 turns the switch 71 off, and does not connect the power source 72 with the repeater 60. In other words, the power supply ECU 70 performs processing of not authorizing powering the repeater 60. Thus, in the electronic control device for a vehicle of the third embodiment, the power supply ECU 70 functions as a repeater powering authorization unit.

If powering the repeater 60 is authorized, because the repeater 60 operates by powering, the repeater 60 is ready to receive a signal from the in-vehicle LAN 30. Therefore, the repeater 60 or the communication authorization unit 62 incorporated in the repeater 60 receives the authentication result of the external device 90 from the in-vehicle LAN 30. If the authentication result of the external device 90 is a successful authentication, the communication authorization unit 62 authorizes the communications between the external device 90 and the in-vehicle LAN 30, and releases the unauthorized access protecting function of the unauthorized access protecting unit 61. By doing this, the unauthorized access protecting function is removed, and the external device 90 can access the in-vehicle LAN 30 by connecting the external device 90 to the connector 80.

By contrast, if the repeater 60 or the communication authorization unit 62 receives the authentication result of the authentication failure, the communication authorization unit 62 does not authorize the communications between the external device 90 and the in-vehicle LAN 30 by the repeater 60, and does not release the unauthorized access protecting function. By doing this, a state in which the external device 90 cannot access the in-vehicle LAN 30 is continued.

In this manner, in the electronic control device for a vehicle, the power supply ECU 70 authorizes powering the repeater 60 based on the successful authentication between the smart key 10 and the vehicle 20, then the powered repeater 60 authorizes the communication of the repeater 60 by receiving the authentication information of the successful authentication, which requires two-stage authorization. With this, security can be further enhanced.

Here, in the verification ECU 43, even if the authentications of the smart key 10 and the external device 90 are independently performed, because the verification ECU 43 cannot receive the successful authentication of the external device 90 if the repeater 60 is not authorized to be powered, similar two-stage processing is also performed in this case. Next, descriptions are given about a process flow of the electronic control device for a vehicle of the third embodiment.

Figure 7:
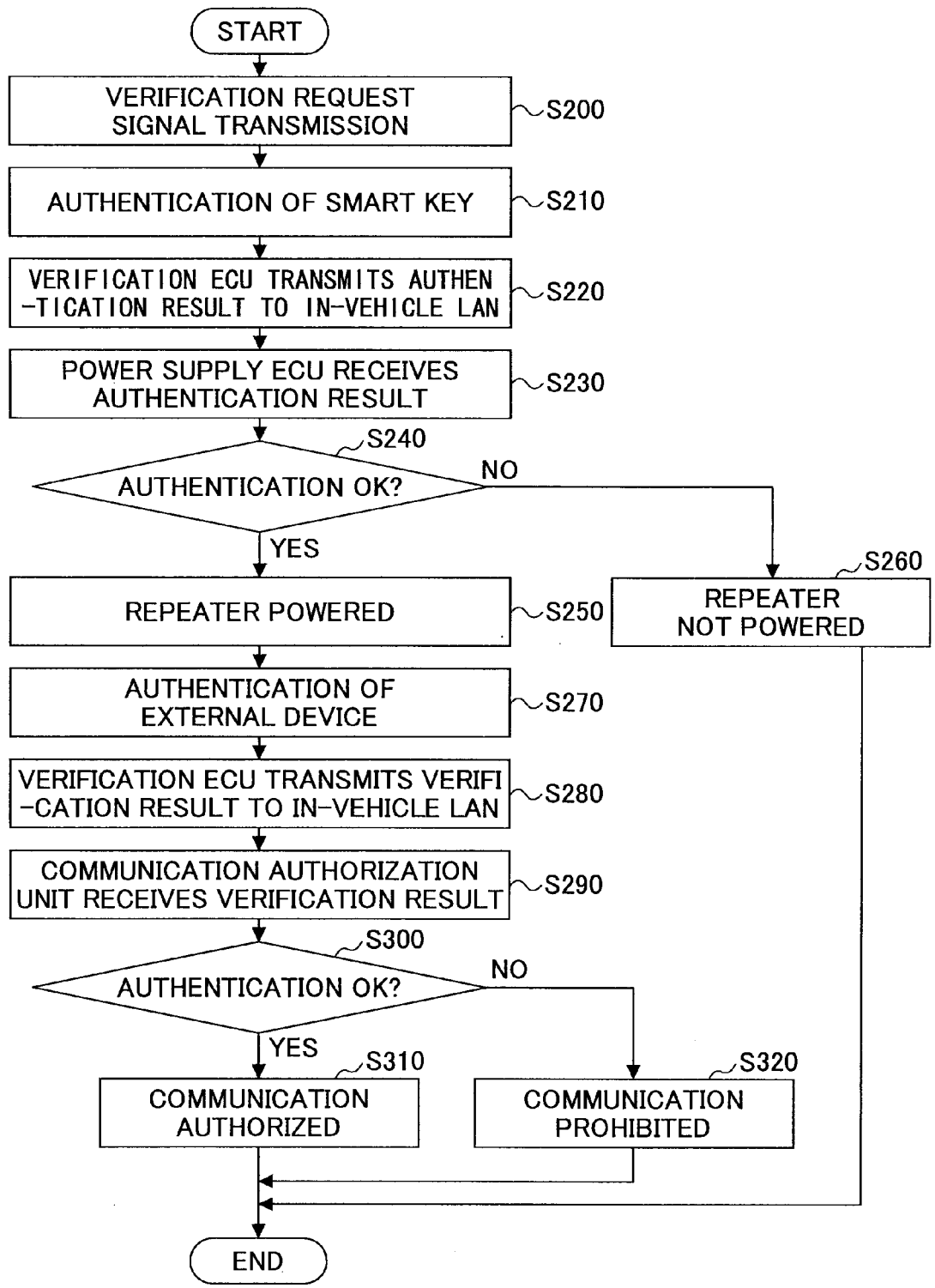
FIG. 7 is a diagram showing an example of a process flow of the electronic control device for a vehicle of the third embodiment.

FIG. 7 is a diagram showing an example of a process flow of the electronic control device for a vehicle of the third embodiment. Here, the same numerals are put to components described in FIG. 6, and the descriptions are omitted.

In step S200, the smart key 10 transmits a verification request signal to the verification ECU 43 of the in-vehicle authentication system 42.

In step S210, the verification ECU 43 authenticates the smart key 10.

In step S220, the verification ECU 43 transmits the authentication result to the in-vehicle LAN 30. Regarding the authentication result, authentication information of a successful authentication or an authentication failure is transmitted.

In step S230, the power supply ECU 70 receives the authentication result.

In step S240, whether the authentication is Ok (successful authentication) is determined. If the authentication is OK, the process proceeds to step S250, and if the authentication is NO (authentication failure), the process proceeds to step S260.

In step S250, the power supply ECU 70 turns the switch 71 on, and the repeater 60 is powered.

On the other hand, in step S260, the power supply ECU 70 turns switch 71 off, and the repeater 60 is not powered. In this state, since the repeater 60 does not operate, the process flow ends.

In step S270, the verification ECU 43 of the in-vehicle authentication system 42 authenticates the external device 90.

In step S280, the verification ECU 43 transmits an authentication result (authentication information) of the external device 90 to the in-vehicle LAN 30.

In step S290, a main body of the repeater 60 or the communication authorization unit 62 receives the authentication result between the external device 90 and the vehicle 20.

In step S300, whether the authentication result of the external device 90 is an OK authentication (successful authentication) is determined. In step S300, if the authentication is OK, the process proceeds to step S310, and if the authentication is NO (authentication failure), the process proceeds to step S320.

In step S310, the communication authorization unit 62 authorizes the communication, the unauthorized access protecting function by the unauthorized access protecting unit 61 is released, and the process flow ends. As a result of this, because the communication between the external device 90 and the in-vehicle LAN 30 becomes possible though the repeater 60, by connecting the external device 90 with the connector 80, the external device 90 can accesses the in-vehicle LAN 30. Therefore, by connecting the external device 90 with the connector 80, a variety of diagnoses or rewriting programs of the ECUs 50 becomes possible.

In step S320, the communication authorization unit 62 prohibits the communication, by which the unauthorized access protecting function by the unauthorized access protecting unit 61 is maintained, and the process flow ends. Even if the external device 90 is connected to the connector 80, the external device 90 cannot access the in-vehicle LAN 30, and high security is maintained.

Thus, according to the electronic control device for a vehicle of the third embodiment, since the external device 90 can access the in-vehicle LAN 30 by way of two-stage authentication and process, which are powering the repeater 60 and authorizing the communication of the repeater 60, the security can be further improved.

Fourth Embodiment

Figure 8:
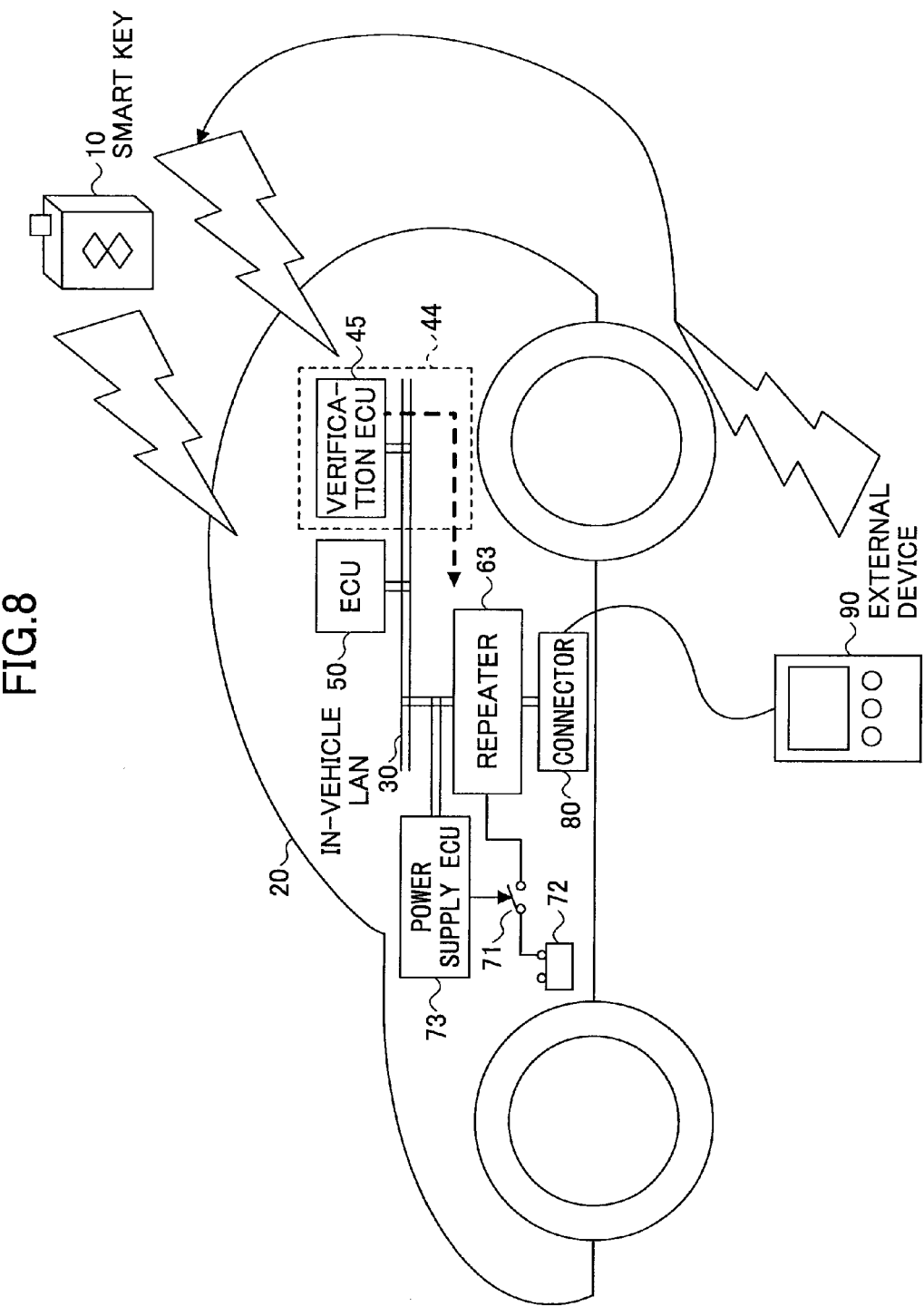
FIG. 8 is a system configuration diagram showing an example of an electronic control device for a vehicle of a fourth embodiment of the present invention.

FIG. 8 is a system configuration diagram showing an example of an electronic control device for a vehicle of a fourth embodiment. The electronic control device for a vehicle of the fourth embodiment includes a smart key 10, an in-vehicle authentication system 44, a variety of ECUs 50, a repeater 63, a switch 71 and a power source 72. Moreover, the in-vehicle authentication system 44 includes a verification ECU 45. Furthermore, a vehicle 20 and an external device 90 are shown in FIG. 8.

In the electronic control device for a vehicle of the fourth embodiment, since the smart key 10, the vehicle 20, the in-vehicle LAN 30, the variety of ECUs 50, the repeater 63, the switch 71, the power source 72, the connector 80 and the external device 90 are similar to the electronic control device for a vehicle of the second and third embodiments, descriptions about the individual components are omitted by putting the same numerals to them.

The electronic control device for a vehicle of the fourth embodiment is common to that of the third embodiment in that the verification ECU 45 of the in-vehicle authentication system 44 authenticates both of the smart key 10 and the external device 90, but the processing contents differ from the electronic control device for a vehicle of the third embodiment.

The verification ECU 45 verifies the smart key 10 first, and if the authentication of the smart key 10 is successful, the verification ECU 45 authenticates the external device 90. In other words, to authenticate the external device 90, the successful authentication of the smart key 10 is needed as a condition. Also, transmission of the authentication result from the verification ECU 45 to the in-vehicle LAN 30 is performed only about the authentication result of the external device 90.

The power supply ECU 73 differs from the power supply ECU 70 of the second and third embodiments in terms of receiving the authentication result of the external device 90, not the authentication result of the smart key 10. However, the power supply ECU 73 is similar to the power supply ECU 70 of the second and third embodiments in that the power supply ECU 73 connects the power source 72 to the repeater 63 by turning the switch 71 on and activates the repeater 63 if receiving the authentication result of the successful authentication, but cuts off the power source 72 by turning the switch 71 off and does not activate the repeater 63 if receiving the authentication result of the authentication failure. In this case, the power supply ECU 73 functions as a communication authorization unit similar to the power supply ECU 70 of the second embodiment.

Thus, the communication authorization of the repeater 63 may be controlled by powering or not powering, making the authentication of both of the smart key 10 and the external device 90 as conditions. The security is improved by two-stage authentication and the repeater 63 with a simple configuration can be used, which can enhance the security at a low cost.

Figure 9:
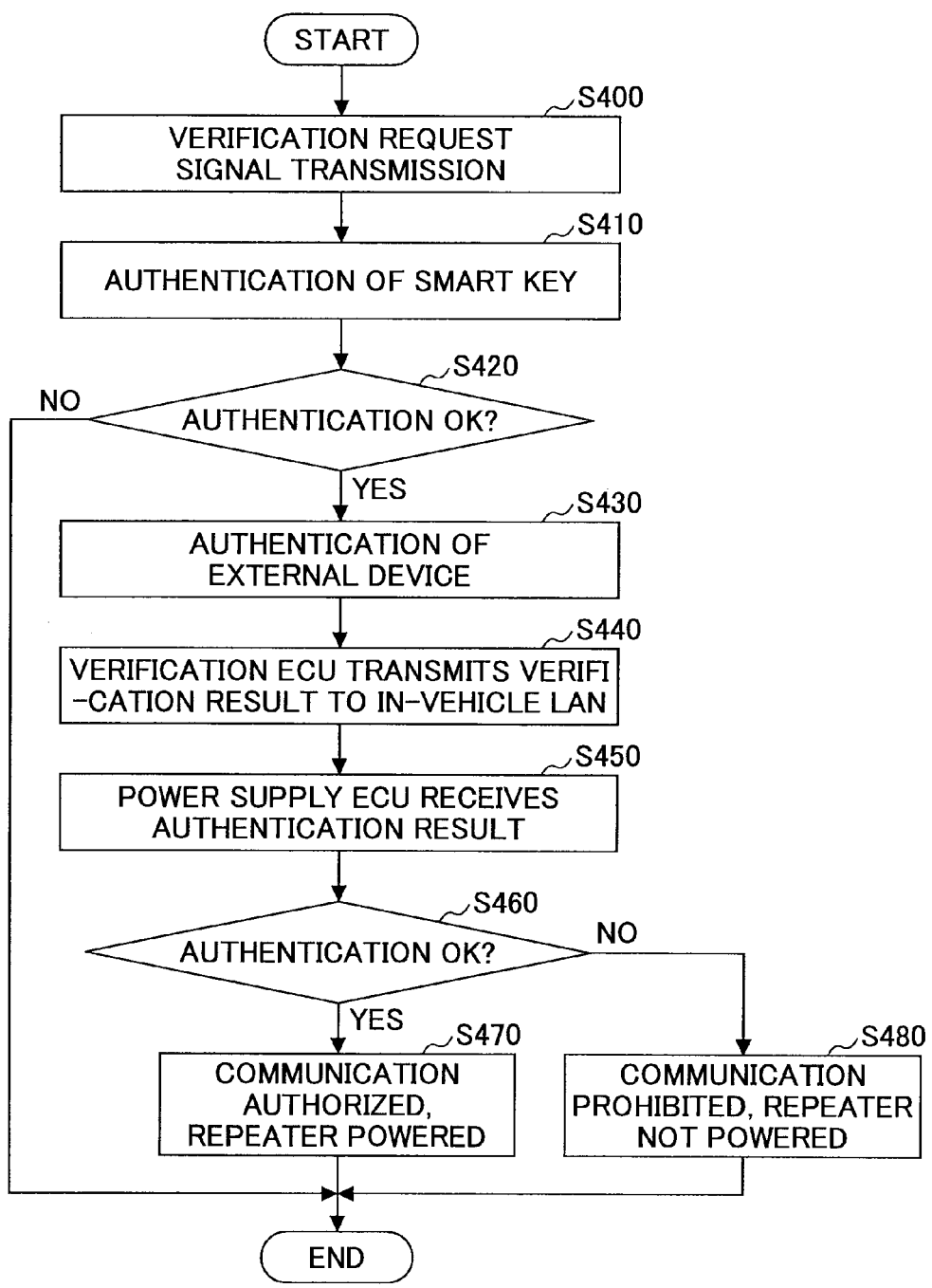
FIG. 9 is a diagram showing an example of a process flow of the electronic control device for a vehicle of the fourth embodiment.

FIG. 9 is a diagram showing an example of a process flow of the electronic control device for a vehicle of the fourth embodiment. Here, the same numerals are put to components similar to those in FIG. 8, and the descriptions are omitted.

In step S400, the smart key 10 transmits a verification request signal to the verification ECU 45.

In step S410, the verification ECU 45 authenticates the smart key 10. The authentication of the smart key 10 may be performed by using an ID code as usual.

In step S420, the verification ECU 45 determines whether the authentication is OK (successful authentication). If the authentication is NO (authentication failure), the process flow ends. In contrast, the authentication is OK, the process proceeds to step S430.

In step S430, the verification ECU 45 authorizes the external device 90. The authentication of the external device 90 may be performed by using the ID code. Since a connectable external device 90 is not necessarily one kind but may be plural kinds, plural ID codes may be prepared in response to the connectable external devices 90.

In step S440, the verification ECU 45 transmits the authentication result of the external device 90 to the in-vehicle LAN 30.

In step S450, the power supply ECU 73 receives the authentication result of the external device 90 of the power supply ECU 73 from the in-vehicle LAN 30.

In step S460, the power supply ECU 73 determines whether the received authentication result is OK (successful authentication). If the authentication is OK, the process proceeds to step S470, and if the authentication is NO (authentication failure), the process proceeds to step S480.

In step S470, the power supply ECU 73 authorizes the communication of the repeater 63, powers the repeater 63 by connecting the power source 72 to the repeater 62 by turning the switch 71 on, and ends the process flow. By doing this, an operation to relay the communication of the repeater 63 starts, and the communications between the external device 90 and the in-vehicle LAN 30 are enabled. A user can access the in-vehicle LAN 30 by connecting the external device 90 to the connector 80. The user can perform a variety of diagnoses or can rewrite programs of the variety of ECUs 50.

In step S480, the power supply ECU 73 prohibits the communication of the repeater 63, cuts off the power source 72 from the repeater 63 to make a non-powered state by turning the switch 71 off, and ends the process flow.

In this way, according to the electronic control device for a vehicle of the fourth embodiment, while the security is improved by authenticating both of the smart key 10 and the external device 90, the electronic control device for a vehicle has a simple configuration in which the communication authorization or prohibition control of the repeater 63 is performed by powering or non-powering, which can enhance the security at a low cost.

INDUSTRIAL APPLICABILITY

The present invention is applicable to an electronic control device for a vehicle that performs various controls of a vehicle by utilizing an in-vehicle network.

The invention claimed is:

1. An electronic control device for a vehicle configured to be able to rewrite a program related to a vehicle control by connecting an external device with the vehicle and by accessing an in-vehicle LAN comprising:
    a portable authentication terminal separated from the external device and configured to transmit a verification request signal to the in-vehicle LAN;
    an in-vehicle authenticator connected with the in-vehicle LAN, configured to authenticate the portable authentication terminal and to be able to transmit an authentication result to the in-vehicle LAN, and including a verifier configured to receive the verification request signal from the portable authentication terminal through the in-vehicle LAN and to authenticate the verification request signal by comparing the verification request signal with a predetermined code signal;
    a repeater configured to relay communication between the external device and the in-vehicle LAN; and
    a communication authorizer connected to the in-vehicle LAN and configured to authorize the communication between the external device and the in-vehicle LAN through the repeater if receiving the authentication result of a successful authentication of the portable authentication terminal by the in-vehicle authenticator,
    wherein each of the repeater and the verifier is configured to be a single independent structure, and the repeater and the verifier are connected to each other through a bus of the in-vehicle LAN.

2. The electronic control device for a vehicle as claimed in claim 1,
    wherein the repeater has an unauthorized access protecting function, and
    the communication authorizer authorizes the communication through the repeater by releasing the unauthorized access protecting function.

3. The electronic control device for a vehicle as claimed in claim 2,
    wherein the communication authorizer is incorporated in the repeater.

4. The electronic control device for a vehicle as claimed in claim 1,
    wherein the communication authorizer authorizes the communication through the repeater by activating the repeater and does not authorize the communication between the in-vehicle LAN and the external device through the repeater by not activating the repeater if the authorization of the portable authentication terminal by the in-vehicle authenticator fails.

5. The electronic control device for a vehicle as claimed in claim 4,
    wherein the communication authorizer switches the repeater on and off by powering or not powering the repeater.

6. The electronic control device for a vehicle as claimed in claim 1,
    wherein the portable authentication terminal is a smart key.

7. The electronic control device for a vehicle as claimed in claim 1,
    wherein a connector connected with the repeater and connectable with the external device is included.

8. An electronic control device for a vehicle configured to be able to rewrite a program related to a vehicle control by connecting an external device with the vehicle and by accessing an in-vehicle LAN comprising:

a portable authentication terminal separated from the external device and configured to transmit a verification request signal to the in-vehicle LAN;

an in-vehicle authenticator connected with the in-vehicle LAN, configured to authenticate the portable authentication terminal and the external device, and configured to be able to transmit each authentication result of the portable authentication terminal and the external device to the in-vehicle LAN. and including a verifier configured to receive the verification request signal and to authenticate the verification request signal by comparing the verification request signal with a predetermined code signal;

a repeater configured to relay communication between the external device and the in-vehicle LAN;

a repeater powering authorizer connected to the in-vehicle LAN and configured to authorize powering the repeater by supplying electricity for the repeater if receiving the authentication result of a successful authentication of the portable authentication terminal by the in-vehicle authenticator; and a communication authorizer incorporated in the repeater and configured to authorize communication between the in-vehicle LAN and the external device through the repeater if receiving the authentication result of a successful authentication of the external device by the in-vehicle authenticator when powered, wherein each of the repeater and the verifier is configured to be a single independent structure, and the repeater and the verifier are connected to each other through a bus of the in-vehicle LAN.

9. The electronic control device for a vehicle as claimed in claim 8, wherein the repeater has an unauthorized access protecting function, and the communication authorizer authorizes the communication between the in-vehicle LAN and the external device through the repeater by releasing the unauthorized access protecting function.

10. The electronic control device for a vehicle as claimed in claim 8, wherein the portable authentication terminal is a smart key.

11. The electronic control device for a vehicle as claimed in claim 8, wherein a connector connected to the repeater and connectable with the external device is included.

12. An electronic control device for a vehicle configured to be able to rewrite a program related to a vehicle control by connecting an external device with the vehicle and by accessing an in-vehicle LAN comprising:

a portable authentication terminal separated from the external device, and configured to transmit a verification request signal to the in-vehicle LAN;

an in-vehicle authenticator configured to be able to authenticate the portable authentication terminal and the external device, and configured to authenticate the external device and to transmit an authentication result of the external device to the in-vehicle LAN if succeeding in authenticating the portable authentication terminal, and including a verifier configured to receive the verification request signal and to authenticate the verification request signal by comparing the verification request signal with a predetermined code; and a repeater configured to relay communication between the external device and the in-vehicle LAN;

a repeater communication authorizer connected to the in-vehicle LAN and configured to authorize the communication between the external device and the in-vehicle LAN through the repeater by powering and activating the repeater if receiving the authentication result of a successful authentication of the external device by the in-vehicle authenticator, wherein each of the repeater and the verifier is configured to be a single independent structure, and the repeater and the verifier are connected to each other through a bus of the in-vehicle LAN.

13. The electronic control device for a vehicle as claimed in claim 12, wherein the portable authentication terminal is a smart key.

14. The electronic control device for a vehicle as claimed in claim 12, wherein a connector connected with the repeater and connectable with the external device is included.

* * * * *